United States Patent [19]
Sink

[11] Patent Number: 5,577,741
[45] Date of Patent: Nov. 26, 1996

[54] COMBINATION LIP AND SLEEVE SEAL AND ITS METHOD OF MANUFACTURE

[75] Inventor: Danny R. Sink, Chester, Va.

[73] Assignee: Brenco Incorporated, Petersburg, Va.

[21] Appl. No.: 503,212

[22] Filed: Jul. 17, 1995

[51] Int. Cl.$^6$ .................................................. F16J 9/06
[52] U.S. Cl. ............................................ 277/153; 277/152
[58] Field of Search .................................. 277/152, 153, 277/207 R, 227, 229

[56] References Cited

U.S. PATENT DOCUMENTS

| | | | |
|---|---|---|---|
| 2,837,359 | 6/1958 | Corsi | 277/153 |
| 3,010,748 | 11/1961 | Haynie | 277/153 |
| 4,171,561 | 10/1979 | Bainard et al. | 277/153 |
| 4,822,058 | 4/1989 | Butler et al. | 277/152 |
| 5,462,287 | 10/1995 | Hering et al. | 277/152 |

FOREIGN PATENT DOCUMENTS

| | | | |
|---|---|---|---|
| 6058426 | 3/1994 | Japan | 277/152 |

*Primary Examiner*—Daniel G. DePumpo
*Attorney, Agent, or Firm*—Kerkam, Stowell, Kondracki & Clarke, P.C.; Edward J. Kondracki

[57] ABSTRACT

A combined lip and sleeve seal for use with a generally cylindrical surface relatively rotating shaft is formed by a molding operation and includes a sleeve seal portion for contacting and forming a first oil seal with the shaft and an integrally joined radial lip seal spaced axially from the sleeve seal for contacting and forming a second oil seal with the shaft. The seal may also include an integrally formed dust seal lip at a location spaced axially from the radial lip seal on the side thereof opposite the sleeve seal. The radial lip seal and sleeve seal may include a liner formed from a low friction synthetic resin material such as a sintered polytetrafluoroethylene. The sleeve seal is formed as an initially generally radially inwardly extending annular flange having an inner diameter less than the outer diameter of the cylindrical surface of the relatively rotating shaft and is deflected axially and expanded radially to provide a substantially cylindrical sealing surface contacting the shaft surface when installed on the shaft.

12 Claims, 4 Drawing Sheets

COMBINATION LIP AND SLEEVE SEAL AND ITS METHOD OF MANUFACTURE

BACKGROUND OF THE INVENTION

Field of the Invention

This invention relates to an improved shaft seal and its method of manufacture, and more particularly to an improved combination seal incorporating a molded elastomeric primary sealing lip and a resilient sealing sleeve for contacting and forming a seal with a relatively rotating cylindrical surface at axially spaced locations on the surface.

DESCRIPTION OF THE PRIOR ART

Shaft seals having a molded elastomeric primary lubricant sealing lip for retaining lubricant on one side of the lip (the oil side) and one or more secondary sealing or dust lips on the side opposite the oil side, are well known, and one such seal is shown in my prior U.S. Pat. No. 5,186,548. It is also known to provide seals of this general type with a lip having a thin liner of low friction polymeric material, for example a fluorocarbon resin such as sintered polytetrafluoroethylene (hereinafter PTFE) and one such seal is shown in U.S. Pat. No. 4,171,561. This patent teaches that the PTFE lined seal can be made using conventional molds and molding techniques employed for molded lip elastomeric seals. A method of and molding apparatus for forming a PTFE lined molded lip seal is also shown and described in my copending U.S. patent application Ser. No. 08/113,449, the entire disclosure of which is incorporated herein by reference.

U.S. Pat. No. 4,613,143 discloses a dual lip shaft seal including a PTFE lined oil seal lip and a PTFE dust seal. The dust seal is in the form of a radially extending annular washer bonded to the elastomeric seal body. The washer has a substantial thickness and presents an annular peripheral surface having edges which, when the washer is flexed either outward or inward, provides a lip contacting the shaft surface to form the dust seal.

Shaft seals are also known in which an initially generally flat or conical, radially extending washer of a resilient sealing material is engaged and deflected both axially and radially by a relatively rotating cylindrical surface to form a seal. While such seals are sometimes called lip seals, in use the deflected sealing element may lie along and contact the cylindrical surface for some finite axial distance in the manner of a cylindrical sleeve, and therefore seals of this type will generally be referred to herein as sleeve seals to distinguish from the lip seals of the type illustrated in the above-mentioned patents. Also, the term "shaft seal" is used herein to refer to sealing devices employed to form a seal with a conventional cylindrical shaft surface and to other relatively rotating generally cylindrical surfaces as well as tapered surfaces.

U.S. Pat. No. 4,643,436 discloses a sleeve seal employing an initially substantially flat washer-like sealing element including a first layer of stretchable fluorocarbon material and a second layer of molded elastomeric material. In use, the sealing element is stretched and deflected sufficiently to be telescoped onto the outer cylindrical surface of a wear sleeve or casing which, in turn, is adapted to be mounted in fluid-tight relation on a relatively rotating shaft, axle, wheel hub, or other element.

U.S. Pat. No. 4,591,168 discloses a seal in which the sealing element, in one embodiment, is initially in the form of a planar annular disk or washer which is deflected and stretched over the outer surface of a relatively rotating shaft to provide an extended sealing surface along the axis of the shaft. The seal of this patent also incorporates hydrodynamic pumping surfaces which act to deflect excessive lubricant from the shaft on the sealed side (oil side).

U.S. Pat. No. 4,243,235 discloses a seal assembly embodying a composite sealing element in which an outer washer-like, elastomeric element is bonded to and supports an inner PTFE washer which is stretched and deflected when installed on a relatively rotating cylindrical surface to form a seal.

U.S. Pat. Nos. 3,948,113 and 4,132,421 disclose sleeve seals in which a sealing element is initially molded in a conical configuration and is deflected, when mounted on a relatively rotating shaft member, to form a seal between the shaft and the initially conical surface. Both of these patents illustrate the use of pumping ribs or grooves on the sealing surface to pump, or deflect, excessive oil from the area of contact in a manner well known in the art. U.S. Pat. No. 4,183,892 discloses a method of forming the seal of U.S. Pat. No. 4,132,421.

U.S. Pat. No. 4,513,796 discloses a seal employing a PTFE sealing element which is initially generally disc-shaped and which is deflected into a generally conical configuration during use. This patent, as well as the above-mentioned U.S. Pat. No. 4,132,421, disclose the use of a molded dust seal used in combination with the primary sleeve sealing element.

Both molded radial lip and sleeve seals are thus well known and have long been separately used to successfully and effectively provide lubricant seals between relatively rotating elements. Such seals are relatively inexpensive, when compared with the cost of the equipment with which they are used, but a failed seal can result in substantial cost both in equipment repair and down time. Accordingly, efforts are continuously being made to increase both the efficiency and reliability of shaft seals. It is, therefore, a primary object of the present invention to provide a longer lasting, more reliable shaft seal.

It is another object to provide such an improved shaft seal which can be produced at substantially the same cost as that of conventional shaft seals.

Another object is to provide such an improved shaft seal which incorporates the advantages of both a molded radial lip seal and a sleeve seal.

Another object is to provide an economical and reliable method of manufacturing a combined molded lip and molded sleeve seal in a single molding operation.

SUMMARY OF THE INVENTION

In the attainment of the foregoing and other objects and advantages of the invention, an important feature resides in providing a seal assembly including a single resilient body incorporating at least one radial lip seal and a sleeve seal, each adapted to contact and form a seal with a relatively rotating cylindrical surface at axially spaced locations therealong.

The combination seal of the present invention may be formed between a pair of cooperating mold elements by placing an annular ring or body of elastomeric material between the mold parts and pressing them together to compress and mold elastomer into the annular mold cavity between the two mold parts in the manner described in the above-mentioned U.S. Pat. Nos. 5,186,548 and 4,171,561. If desired, an annular liner washer or wafer of sintered PTFE may be placed in the mold casting and molded simultaneously with the elastomer to form the sealing surface of at least one seal.

In the known molded lip seals, excess elastomer, or elastomer and liner material, is attached in the form of a waste ring and flash which is trimmed from the molded body after removal from the mold cavity. The cut may be made so that the resulting cut surface forms one conical face of the radial lip seal, or the lip may be molded with the cut being formed along a reduced thickness portion of the molded body at a location spaced radially outward and axially from the seal lip. A process for cutting and removing the waste ring is illustrated in U.S. Pat. No. 4,822,058. It is also known to partially cut or weaken the molded body around an annular tear line, as shown in my above-mentioned copending patent application, to permit the waste ring to be torn from the molded body.

In accordance with the present invention, the surfaces of the mold elements are shaped in the area of the conventional waste ring to provide an integrally formed, generally radially extending internal flange element forming a sleeve seal which, when installed over a relatively rotating cylindrical shaft surface, will be deflected axially away from the molded lip seal to contact and form a seal with the shaft surface. When the PTFE liner is used, the radial flange may consist of a portion of the PTFE liner only, or a layer of molded elastomeric material may extend over all or a portion of the outer surface of the installed sleeve seal element to reinforce and provide dimensional stability for the sleeve, and the thickness on the molded elastomer may vary radially along the flange element to shape the sleeve and maintain the desired area of contact with the shaft during use. After removal of the seal element from the mold, the flange is trimmed to the desired inner diameter to provide the necessary contact area between the sleeve and the shaft surface. The inner periphery of the sleeve seal portion may be cut along a concentric circular line, or may be contoured or fluted to provide pumping surfaces to deflect excess lubricant from the surface of the shaft with which the seal is to be used. Also, the mold element contacting and forming the portion of the seal in the area which will later form the sleeve and come into contact with the shaft may be formed with depressions to form conventional shaped pumping elements on the surface of the sleeve to provide a lubricant pumping function.

BRIEF DESCRIPTION OF THE DRAWINGS

The foregoing and other features and advantages of the invention will be apparent from the detailed description contained hereinbelow, taken in conjunction with the drawings, in which.

DESCRIPTION OF THE PREFERRED EMBODIMENT

Figure 1:
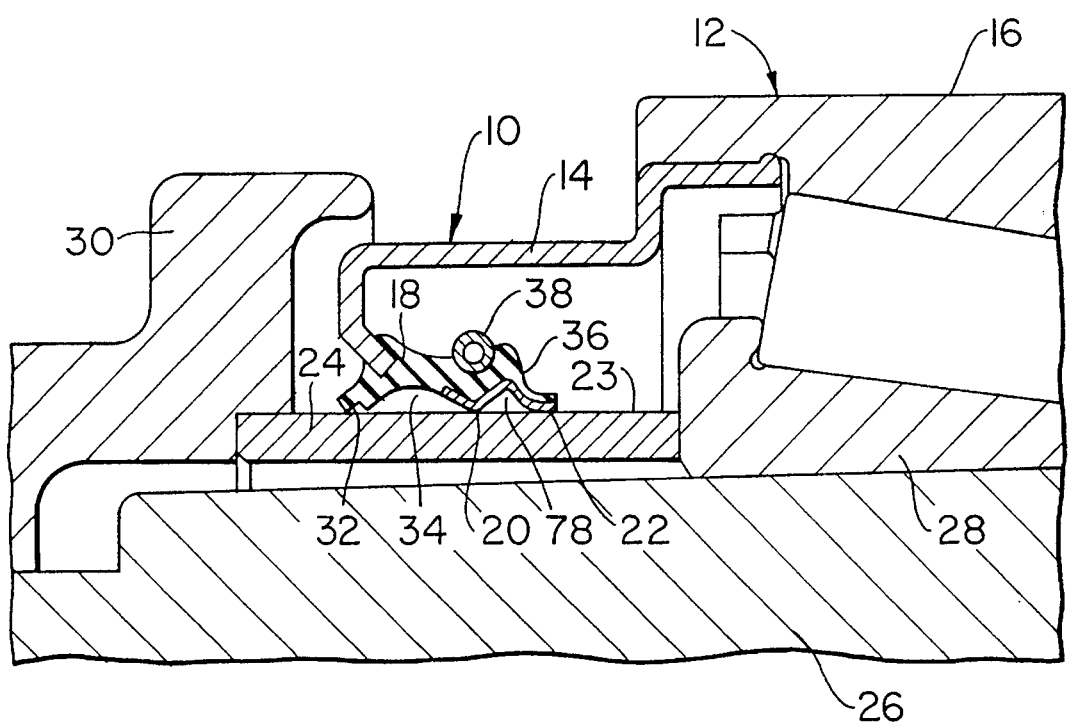
FIG. 1 is a fragmentary sectional view showing a seal according to one embodiment of the present invention used in conjunction with a bearing mounted on a shaft to seal lubricant within the bearing.

Referring now to the drawings in detail, a seal assembly 10 embodying the present invention is illustrated in FIG. 1 as mounted on a roller bearing assembly 12 of the general type conventionally employed as a wheel bearing on rail cars. It is pointed out, however, that the seal assembly of the present invention may be employed in various automotive, industrial and other applications wherein the seal element is in contact with an outwardly directed relatively rotating cylindrical or generally cylindrical surface.

Figure 2:
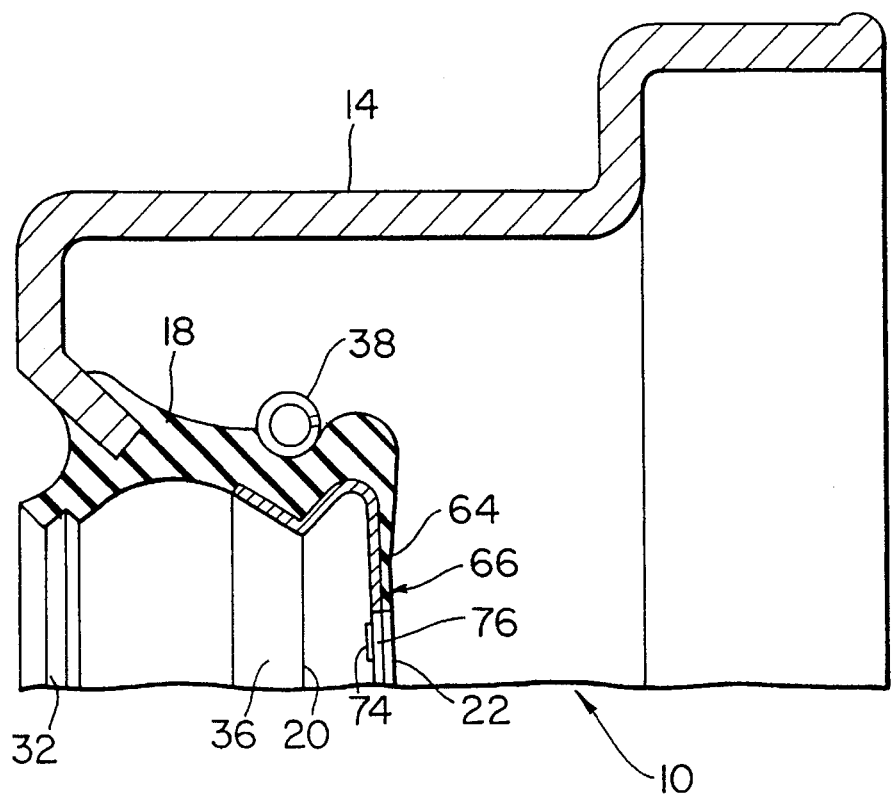
FIG. 2 is an enlarged sectional view of a portion of the seal assembly shown in FIG. 1.

In the embodiment illustrated in FIGS. 1 and 2, seal 10 includes a rigid metal case 14 having one end adapted to be received in a recess in the cup 16 of bearing 12 for rotation therewith. The opposite, inwardly directed end of seal case 14 has molded thereon a resilient elastomeric seal body 18 including an annular radial lip sealing element 20 and an annular sleeve sealing element 22, each adapted to contact the outwardly directed cylindrical surface 23 of a wear ring 24 supported in coaxial relation with the axle 26 between the outer bearing cone 28 and retainer cap 30. Sleeve seal 22 and radial lip seal 20 cooperate to retain lubricant within the bearing, i.e., on the oil side of the seal, and a further seal lip 32 integrally formed on body 18 on the atmosphere side of the seal acts to prevent the ingress of dust and dirt into the annular void 34 between lip 32 (the dust lip) and radial lip seal 20. A liner 36 of low friction material, preferably sintered PTFE, is bonded to the inwardly directed surface of elastomer body 18 and forms the sealing surface of radial seal lip 20 and sleeve seal 22 to provide low friction contact with the outer cylindrical surface of wear ring 24. A garter spring 38 may be employed to resiliently urge lip seal 20 into contact with the wear ring surface in the manner well known in the art.

Figure 3:
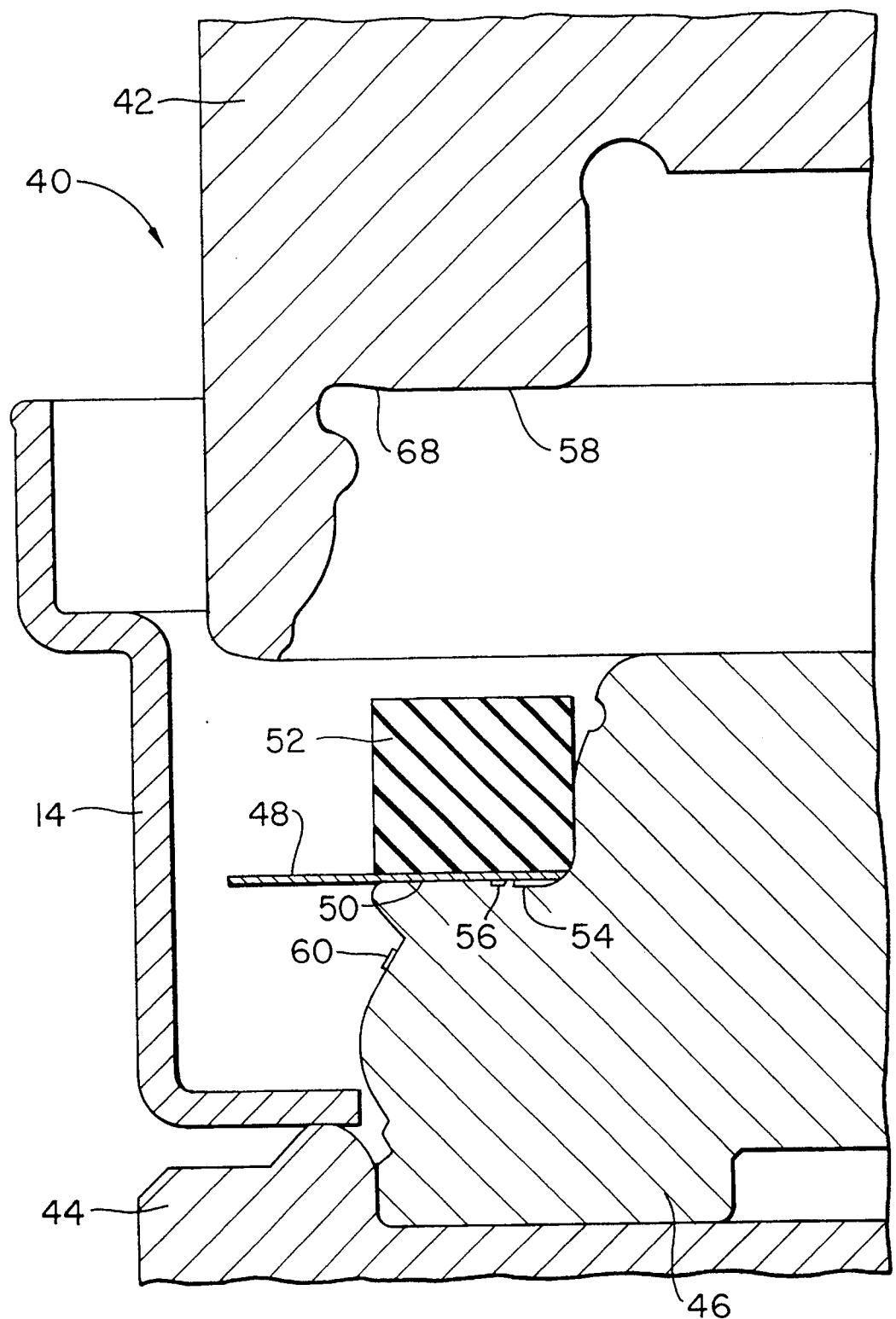
FIG. 3 is an enlarged schematic sectional view of a portion of an annular molding apparatus, in its open position, suitable for use in forming a seal of the present invention, with the metal seal case and concentric annular preforms of a moldable elastomer and a sintered fluorocarbon liner in position within the mold.
Figure 4:
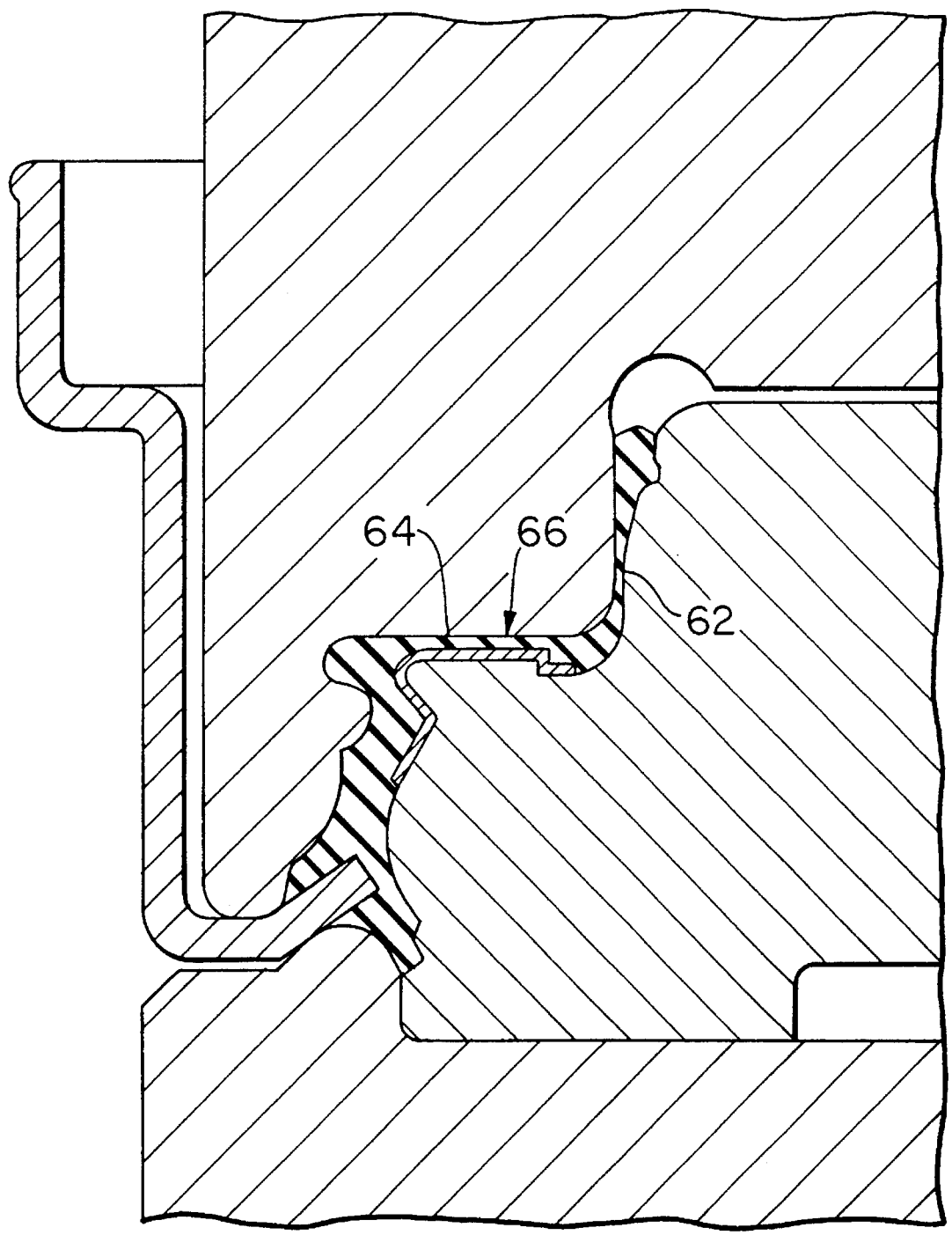
FIG. 4 is a view similar to FIG. 3, on a smaller scale, showing the mold in the closed position.

Referring now to FIGS. 3 and 4, a method of and molding apparatus for use in forming the improved seal of the invention will be described. The mold assembly, indicated generally at 40, includes an annular upper mold element 42, a lower mold support 44 and a mold core 46 mounted on and supported by the lower mold support 44. Upper mold element 42 and the lower mold support and mold core 44, 46 are mounted for relative vertical movement by conventional means not shown and, of course, such apparatus includes suitable heating means for heating the mold elements as required to produce the necessary plastic flow and to vulcanize the elastomer and shape the PTFE liner during the molding operation.

To mold a seal according to the embodiment of the invention shown in FIGS. 1 and 2, a seal case 14 is positioned on the lower mold support member 44 and a thin annular wafer 48 of sintered PTFE is positioned on a horizontal ledge portion 50 of core 46 and an annular preform 52 of suitable moldable elastomeric material is supported on top of wafer 48 above ledge 50. The wafer 48 is preferably a substantially flat washer-like ring having a thickness within the range of about 0.010 to about 0.050 inches, and preferably is cut from a tube of cast and sintered material so as to display substantially uniform physical and mechanical properties in all directions. The wafer may also be etched and coated with a suitable bonding agent to assure a strong bond with the elastomer material during molding.

The elastomeric preform may be a nitrile buna synthetic rubber and may be blended with other materials such as a reinforcing filler, a low friction enhancer such as graphite, and bonding agents, for example.

Ledge 50 preferably has an annular recess portion around its inner periphery as shown at 54, and surface discontinuities indicated schematically at 56 may be formed in the top surface of ledge 50 adjacent to annular recess 54 to provide hydrodynamic pumping surfaces on the sleeve seal as explained more fully hereinbelow.

Upon initial closing of the mold by relative downward movement of mold element 44, a downwardly directed generally horizontal ledge 58 engages and applies a compressive load to the top surface of preform 52. The initial pressure on preform 52 causes sintered liner 48 to be depressed into the recess 54 which acts as an anchor to prevent shifting of the sintered liner during further movement of the mold elements. Mold element 46 may also be provided with surface discontinuities in the area which forms the lip seal 20, as indicated schematically at 60 to provide hydrodynamic pumping surface contours on the radial lip seal in a manner known in the art.

The volume of elastomeric material in the body 52 may be slightly greater than that required to completely fill the mold cavity upon completion of the molding operation, with the excess elastomer being extruded through a restricted passage to a reservoir spaced radially inward from the sintered liner 36 to form a flash ring as shown at 62 in FIG. 4. In this closed mold position, a layer 64 of molded elastomer overlies and cooperates with the radially inwardly extending portion of liner 36 to provide a laminated, firmly bonded relatively thin web 66 joining the flash ring 62 to elastomeric body 18. As best seen in FIG. 3, the ledge 58 may be contoured as at 68 to provide a slightly thickened portion of web 66 adjacent its juncture with the seal body 18.

After the compressed elastomer material of preform 52 has been heated and vulcanized in the mold, the mold is opened and the seal case 14 with the attached elastomer material is removed from the mold core. In this condition, the radially inwardly extending web 66 has an axially offset annular step as shown at 70 in FIG. 5 formed by the recess 54 and this offset extends inwardly and is joined to the flash ring 62.

Figure 5:
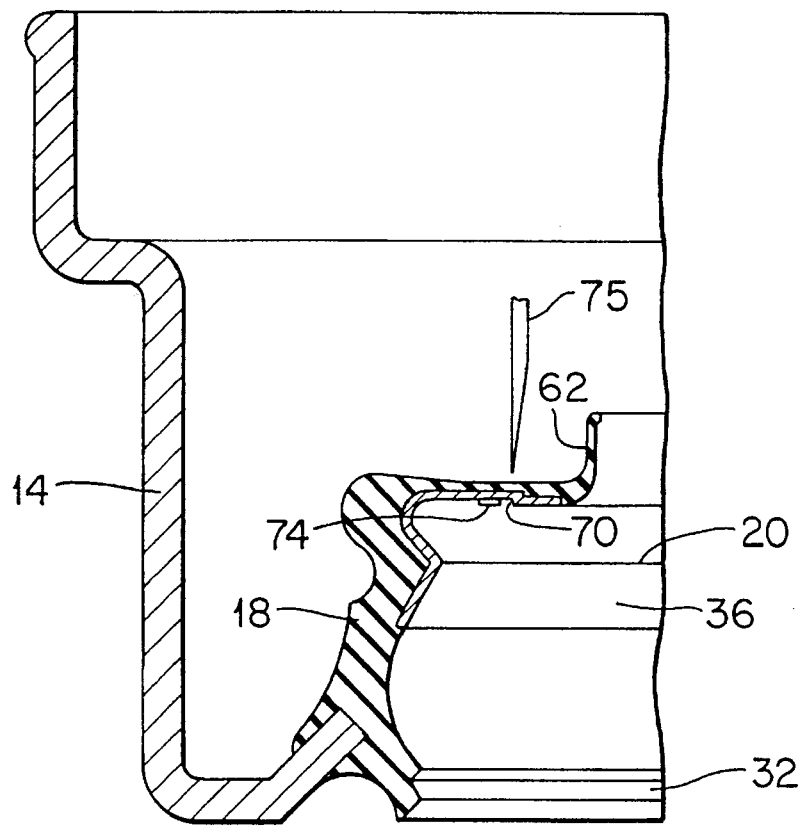
FIG. 5 is an enlarged fragmentary sectional view of the molded seal removed from the mold element and schematically showing a trimming blade used to trim waste material from the molded assembly.

In the production of known molded radial lip seals, the radially extending web 66 and the flash material 62 would be considered waste which is severed to produce the seal lip as shown, for example, in U.S. Pat. No. 4,822,058. In my copending application mentioned above, a weakened score line is produced in the molding operation to facilitate removal of the waste ring. In accordance with the present invention, however, the web is trimmed along a line spaced adjacent to, but radially outward from the offset or step 70 to provide a generally radially extending laminated flange 72 which constitutes an effective sleeve seal. The flange may be of increased thickness progressively outward from the trim line, and may be trimmed along a line immediately inboard of the hydrodynamic pumping surface contours 74 formed by recesses 56. The trimming operation may be by use of a blade 75 as schematically shown in FIG. 5 or by a simple stamping or die cutting operation, with the line of trim being either circular or noncircular to form either an annular or an undulating or otherwise contoured radial inner face or edge 76. An undulating edge 76 may be effective in providing a pumping action tending to expel lubricant from the surface 23 adjacent the edge 76 during operation.

In use, the improved seal according to the present invention is telescoped onto the cylindrical shaft surface to be sealed. The initially generally radially extending flange or web 66 is deflected axially away from radial lip seal 20 and radially outward sufficiently to receive the cylindrical surface, and to extend in contact therewith for a finite distance determined by the diameter of the flange 22 and the resiliency of the flange 66. When installed on the shaft, or wear ring surface, the edge surface 76 extends generally radially and is directed away from the lip seal 20. By trimming the web at a location to provide an initial inner diameter for the sleeve seal which is substantially less than the lip seal 20, the sleeve seal portion will assume a substantially cylindrical 10 configuration overlying and contacting the cylindrical surface to be sealed along a predetermined finite axial distance.

Hydrodynamic pumping surface contours 74, alone or in combination with a contoured surface 76, limit the amount of lubricant which ultimately works its way beneath seal 22 and into contact with radial lip seal 20. Further, the hydrodynamic pumping surfaces formed by the surface discontinuities 60 on lip seal 20 will tend to pump any lubricant which does leak into the void 78 back toward the seal 22, thereby providing a highly reliable, double seal for the bearing or other mechanism to be sealed. Pumping action of the lip seal 20 may tend to slightly pressurize lubricant which collects in the void 78 between seals 20 and 22, thereby assisting the pumping surfaces on sleeve seal 22 in preventing excess leakage past the sleeve seal.

By providing a slightly greater thickness of the layer 64 of elastomer material at the radial outer portion of the sleeve seal element, a more uniform contact pressure may be maintained between the sleeve seal 22 and the cylindrical surface 23.

Figure 6:
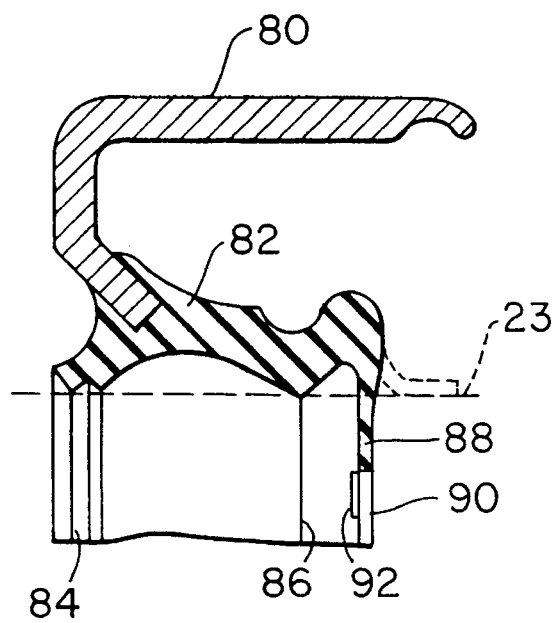
FIG. 6 is a fragmentary sectional view of an alternate embodiment of the seal mounted on a relatively rotating shaft.
Figure 7:
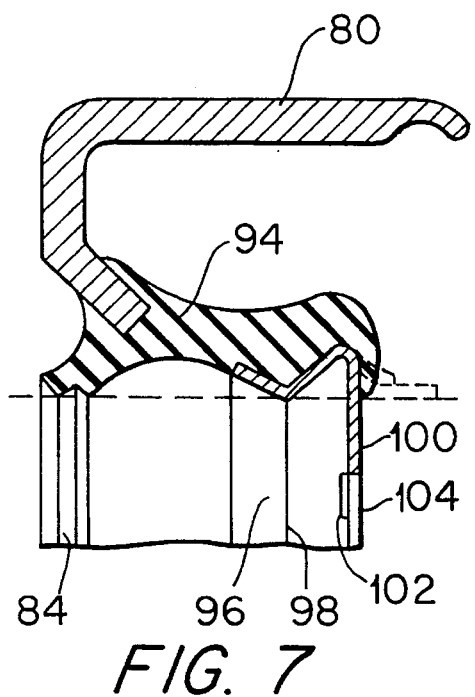
FIG. 7 is a view similar to FIG. 6 and showing a further embodiment.

Referring now to FIGS. 6 and 7, alternate embodiments of the invention will be described. In these embodiments, the seal is illustrated as incorporating a steel case member 80 of the type conventionally employed with automotive or industrial bearings. In the embodiment of FIG. 6, the molded elastomeric body and the seal lip configurations are similar to that described above with regard to FIGS. 1–5, with the PTFE liner omitted. Thus, the seal includes a conventional dust lip 84, an annular radial seal lip 86 and an integrally formed sleeve seal 88 having an annular, inwardly directed face 90 and hydrodynamic oil pumping projections 92 formed thereon. As with the embodiment described above, the sleeve seal element, prior to installation on a cylindrical shaft, is in the form of a substantially radially inwardly extending flange which is deflected axially, as shown in broken lines by contact with the cylindrical surface 23 so that the normally radial face of the flange closest to the seal lip 86 will be deflected and provide a substantially cylindrical sealing surface in contact with the shaft surface over a predetermined axial length which will depend to some extent on the relative diameter between the face 90 and the diameter of the shaft 23.

In the FIG. 7 embodiment, the molded elastomeric body 94 has integrally bonded thereto a PTFE liner 96 which defines the radial lip seal 98 and the sleeve seal 100, with seals 98 and 100 being axially spaced from a conventional dust seal lip 84. As with the previously described embodiments, hydrodynamic pumping projections 102 may be formed on the face of the sleeve seal closest the radial lip seal. In this embodiment, the elastomeric body 94, when molded, does not extend over the full radial extent of the PTFE flange which defines the sleeve seal, but rather terminates at a distance spaced from the inwardly directed annular face 104. Preferably, the molded elastomer terminates at a point spaced from the surface 104 sufficient that the molded elastomer forms no part, or only a small part of the sleeve seal when installed on a cylindrical shaft surface.

It is apparent that the embodiment of the invention illustrated in FIG. 6 may be molded in the same manner as that described hereinabove with regard to FIGS. 1–5, with the exception that the PTFE preform is omitted from the molds. In the FIG. 7 embodiment, precautions must be made to prevent the molded elastomeric material from flowing radially inward over the outwardly directed face of the PTFE material which forms the sleeve seal. This may be accomplished by providing a mold part which initially contacts and clamps the radial inner portion of the PTFE preform into contact with the horizontal edge and acts as a stop to prevent radial inward flow of the molded elastomeric material. It is also apparent that the dimensional configuration of the elastomeric preform will necessarily be different in order to produce the desired flow patterns within the mold, and means may be provided to permit excess material to be trimmed from the final molded configuration in the area of the dust seal 84.

While preferred embodiments of the invention have been disclosed and described, it should be understood that the invention is not restricted solely thereto, but rather that it is intended to include all embodiments which would be apparent to one skilled in the art and which come within the spirit and scope of the invention.

I claim:

1. A combination radial lip and sleeve seal assembly for a relatively rotating shaft surface comprising, the seal assembly having an oil side and an atmosphere side,
    a rigid metal seal case,
    a seal body of elastomeric material mounted on and permanently bonded to said seal case, said seal body comprising a radial lip seal and a sleeve seal, said sleeve seal being spaced axially from the radial lip seal on the oil side of the seal assembly,
    said sleeve seal being in the form of an inwardly directed generally radially extending annular flange having a generally radially extending face on the side thereof closest said radial lip seal, said annular flange having an inner diameter substantially less than the diameter of said radial lip seal,
    said flange being sufficiently resilient to be axially telescoped onto the shaft surface and deflected in the direction away from said lip seal when the seal assembly is mounted on the shaft whereby the radially inner portion of said flange assumes a substantially cylindrical configuration with said generally radially extending face in contact with the relatively rotating shaft for a finite distance along the axis of the shaft.

2. The oil seal defined in claim 1 further comprising hydrodynamic pumping surfaces formed on said radially inner portion of said generally radially extending surface of said flange in position to contact the rotating shaft surface when the seal assembly is installed thereon.

3. The oil seal defined in claim 2 further comprising hydrodynamic pumping surfaces on said radial lip seal.

4. The oil seal defined in claim 1 further comprising a dust seal lip integrally formed from said body of elastomeric material for contacting the rotating shaft surface at a location spaced axially from said radial lip seal on the atmosphere side thereof.

5. The oil seal defined in claim 1 wherein the inner peripheral surface of said flange is contoured around its circumference to expel lubricant from the rotating shaft surface when the seal assembly is installed thereon.

6. The oil seal defined in claim 5 further comprising hydrodynamic pumping surfaces formed on said radially inner portion of said generally radially extending surface of said flange in position to contact the rotating shaft surface when the seal assembly is installed thereon.

7. The oil seal defined in claim 1 further comprising a single PTFE liner bonded to said elastomeric body, said single PTFE liner forming the sealing surfaces of both said radial lip seal and said sleeve seal.

8. The oil seal defined in claim 7 wherein said annular flange comprises a layer of said elastomeric material extending over and bonded to said PTFE liner, said layer of elastomeric material defining the radial face of said annular flange on the side thereof farthest from said radial lip seal.

9. The oil seal defined in claim 8 wherein the thickness of said annular flange is less in the area adjacent its inner periphery than in the area spaced radially outwardly therefrom.

10. The oil seal defined in claim 9 further comprising hydrodynamic pumping surfaces formed on said radially inner portion of said flange in position to contact the rotating shaft surface when the seal assembly is installed thereon.

11. The oil seal defined in claim 10 wherein the inner peripheral surface of said flange is contoured around its circumference to expel lubricant from the rotating shaft surface when the seal assembly is installed thereon.

12. The oil seal defined in claim 11 further comprising a dust seal lip integrally formed from said body of elastomeric material for contacting the rotating shaft surface at a location spaced axially from said radial lip seal on the atmosphere side thereof.

* * * * *